(12) United States Patent
Zheng et al.

(10) Patent No.: US 11,302,358 B2
(45) Date of Patent: Apr. 12, 2022

(54) HOLOGRAPHIC DATA STORAGE DEVICE WITH SINGLE-ARM STRUCTURE

(71) Applicant: Amethystum Storage Technology Co., Ltd., Guangdong (CN)

(72) Inventors: Mu Zheng, Guangdong (CN); Tiewei Luo, Guangdong (CN); Jun Tian, Guangdong (CN); Dejiao Hu, Guangdong (CN); Yicheng Liu, Guangdong (CN)

(73) Assignee: Amethystum Storage Technology Co., Ltd., Guangdong (CN)

( * ) Notice: Subject to any disclaimer, the term of this patent is extended or adjusted under 35 U.S.C. 154(b) by 0 days.

(21) Appl. No.: 17/135,113

(22) Filed: Dec. 28, 2020

(65) Prior Publication Data
US 2021/0201948 A1    Jul. 1, 2021

(30) Foreign Application Priority Data

Dec. 31, 2019    (CN) .......................... 201911422745.6

(51) Int. Cl.
| | | |
|---|---|---|
| *G11B 7/135* | (2012.01) | |
| *G11B 7/0065* | (2006.01) | |
| *G11B 7/08* | (2006.01) | |
| *G11B 7/1372* | (2012.01) | |
| *G11B 7/1381* | (2012.01) | |
| *G11B 7/1395* | (2012.01) | |

(52) U.S. Cl.
CPC ............ *G11B 7/0065* (2013.01); *G11B 7/083* (2013.01); *G11B 7/1372* (2013.01); *G11B 7/1381* (2013.01); *G11B 7/1395* (2013.01)

(58) Field of Classification Search
None
See application file for complete search history.

(56) References Cited

U.S. PATENT DOCUMENTS

| | | | | |
|---|---|---|---|---|
| 6,108,110 A | * | 8/2000 | Orlov ................... | G11C 13/042 359/11 |
| 2005/0180291 A1 | * | 8/2005 | Ogasawara ........ | G11B 7/00772 369/103 |
| 2006/0245020 A1 | * | 11/2006 | Kawano ............... | G11C 13/042 359/29 |
| 2007/0268539 A1 | * | 11/2007 | Toishi ...................... | G03H 1/28 359/11 |
| 2008/0088898 A1 | * | 4/2008 | Szarvas ................ | G03H 1/0402 359/24 |
| 2012/0281197 A1 | * | 11/2012 | Tharaldsen ...... | G01N 21/95623 355/71 |

* cited by examiner

*Primary Examiner* — Peter Vincent Agustin
(74) *Attorney, Agent, or Firm* — Muncy, Geissler, Olds & Lowe, P.C.

(57) ABSTRACT

The present invention relates to a holographic data storage device with a single-arm structure, and belongs to the technical field of optical holographic storage. According to the device disclosed in the present invention, a part of a reference arm and a part of a signal arm are integrated together to form a single-arm structure, which can not only reduce the number of optical and mechanical elements, but also reduce the system volume and cost without degrading performance. In addition, a signal beam and a reference beam share the same relay lens, so that the impact of environmental interference on the two beams is equal, and the stability of the entire system is improved.

20 Claims, 2 Drawing Sheets ant">
HOLOGRAPHIC DATA STORAGE DEVICE WITH SINGLE-ARM STRUCTURE

CROSS REFERENCE TO RELATED APPLICATIONS

The present application claims priority from Chinese Patent Application No. 201911422745.6 filed on Dec. 31, 2019, all of which are hereby incorporated herein by reference.

TECHNICAL FIELD

The present invention relates to the technical field of optical holographic storage, and in particular, to a holographic data storage device with a single-arm structure.

BACKGROUND

In order to perform shift multiplexing holographic storage by using a spherical reference beam, laser is taken as a light source and divided into a signal beam and a reference beam by using a beam splitter. These beams pass through different optical paths and then interfere on a storage medium to form a hologram for recording information, specifically as shown in FIG. 1.

FIG. 1 is a structural diagram of an optical system of a conventional data storage device with a dual-arm structure. After a laser beam emitted from a laser device is expanded to adjust the polarization direction, the laser beam is split by a polarizing beam splitter. The transmitted signal beam is loaded with an input signal by a spatial light modulator and then imaged by a relay lens. The reflected reference beam is condensed to adjust the polarization direction. After being processed by the relay lens, the signal beam and the reference beam are incident to the storage medium at a certain angle and interfere to form a hologram. In this system, signal light is processed by a signal arm, and reference light is processed by a reference arm. It is a holographic storage system with two arms physically separated. This optical system with two physical arms has defects in compactness and anti-interference stability, which are key problems that urgently need to be solved in practical applications.

SUMMARY

The present invention discloses a compact and stable holographic storage system with a single-arm structure, which integrates a part of a signal arm and a part of a reference arm, and performs holographic storage by using a spherical wave reference light shift multiplexing method. There are two polarizing beam splitters in an optical system as a beam combiner and a beam splitter, which perform beam combining and splitting operations on reference light and signal light successively. A relay lens group including a filter is disposed between the beam combiner and the beam splitter, and can transmit and filter patterns on a spatial light modulator. When Fourier holography is used, the filter can also control the size of a hologram on a storage medium. Moreover, a lens in the relay lens group is fixed on an actuator that can move in the optical axis direction or the shift multiplexing direction. If the conditions of reading and recording are different due to changes in medium temperature, etc., the actuator is controlled to compensate for an error. The actuator only operates in a readout process.

Because the relay lens is shared by the signal light and the reference light, such an optical system is called a "single-arm structure". The single-arm structure can not only reduce the number of optical and mechanical elements, but also reduce the system volume and cost without degrading performance. Moreover, because a signal beam and a reference beam share the same relay lens, the impact of environmental interference on the two beams is equal, and the stability of the system is improved.

Specifically, the holographic data storage device with a single-arm structure includes a laser output unit, a beam combining unit, a reference arm, and a beam splitting unit, where the laser output unit is configured to output light and perform beam expansion processing on the light; the light subjected to beam expansion processing is incident to the beam combining unit, and the beam combining unit converts the input light into a signal beam and a reference beam which are coaxial and have orthogonal polarization directions, and outputs same to the beam splitting unit; the beam splitting unit separates the received signal beam and reference beam, the reference beam enters a reference arm, and the signal beam is incident to a storage medium; the reference beam is adjusted by the reference arm and then incident to the storage medium; the signal beam and the reference beam are emitted and interfered on the storage medium to form a hologram for recording information in the storage medium.

The holographic data storage device with a single-arm structure further includes a signal reproduction unit, configured to read a signal stored in the storage medium.

Preferably, the laser output unit includes a light source emitter, a beam expander, and a first half-wave plate; light emitted from the light source emitter is processed by the beam expander and the first half-wave plate and then incident to the beam combining unit; and the first half-wave plate is configured to adjust a beam intensity ratio of the signal beam to the reference beam.

Preferably, the beam combining unit includes a beam combiner, a spatial light modulator, a first reflector, and a relay lens group: the beam combiner first divides light from the laser output unit into a reference beam and a signal beam with orthogonal polarization directions; the signal beam is reflected by the first reflector and then loaded with an input modulation signal by the spatial light modulator; the modulated signal beam and reference beam are combined in the beam combiner, pass through the relay lens group together, and then are incident to the beam splitting unit.

As an alternative, the beam combining unit includes a beam combiner, a spatial light modulator, a first reflector, a first quarter-wave plate, a second quarter-wave plate, and a relay lens group; the beam combiner first divides light from the laser output unit into a reference beam and a signal beam with orthogonal polarization directions; after the signal beam is reflected by the first reflector and transmitted twice by the first quarter-wave plate, the polarization direction becomes the same as the polarization direction of the reference beam, and the signal beam is reflected by the beam combiner, passes through the second quarter-wave plate, and then is loaded with an input signal by the spatial light modulator and reflected; the modulated signal beam is incident to the beam combiner again after passing through the second quarter-wave plate again, and combines with the reflected reference beam to pass through the relay lens group together and then is incident to the beam splitting unit.

A low-pass filter is disposed in the middle of the relay lens group to spatially filter the signal beam.

The beam combiner is an optical element with polarization selectivity characteristics, which is a first polarizing beam splitter.

Preferably, the beam splitting unit includes a beam splitter and a first Fourier lens; the signal beam and the reference beam from the beam combining unit are separated by the beam splitter; the signal beam is incident to the first Fourier lens and then to the storage medium; and the reference beam is incident on the reference arm.

The beam splitter is an optical element with polarization selectivity characteristics, which is a second polarizing beam splitter.

Preferably, the reference arm includes a second reflector and a second half-wave plate; the polarization direction is adjusted by the second half-wave plate after the incident reference beam passes through the second reflector, so that the reference beam is the same as the signal beam and then incident to the storage medium.

Preferably, the signal reproduction unit includes a second Fourier lens and a photodetector; the reference beam is irradiated on a hologram for recording information in the storage medium, and input information is reproduced by using the obtained diffracted light in the original signal beam direction, and is read by the photodetector after being processed by the second Fourier lens.

Compared with the prior art, the present invention has the following beneficial effects: The holographic storage device with a single-arm structure can not only reduce the number of optical and mechanical elements, but also reduce the system volume and cost without degrading performance. Moreover, because the signal beam and the reference beam share the same relay lens, the impact of environmental interference on the two beams is equal, and the overall stability of the system is improved.

BRIEF DESCRIPTION OF DRAWINGS

To describe the technical solutions in the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts. The above and other objectives, features and advantages of the present invention will be clearer through the accompanying drawings.

DESCRIPTION OF EMBODIMENTS

The technical solutions in embodiments of the present invention are clearly and completely described below in conjunction with the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The accompanying drawings of the present invention are only for exemplary description and cannot be construed as limiting the present invention. To better illustrate the following embodiments, some components in the accompanying drawings may be omitted, enlarged or downscaled, and do not represent the size of the actual product. For a person skilled in the art, it can be understood that some well-known structures and descriptions thereof in the accompanying drawings may be omitted.

Embodiment 1

Figure 1:
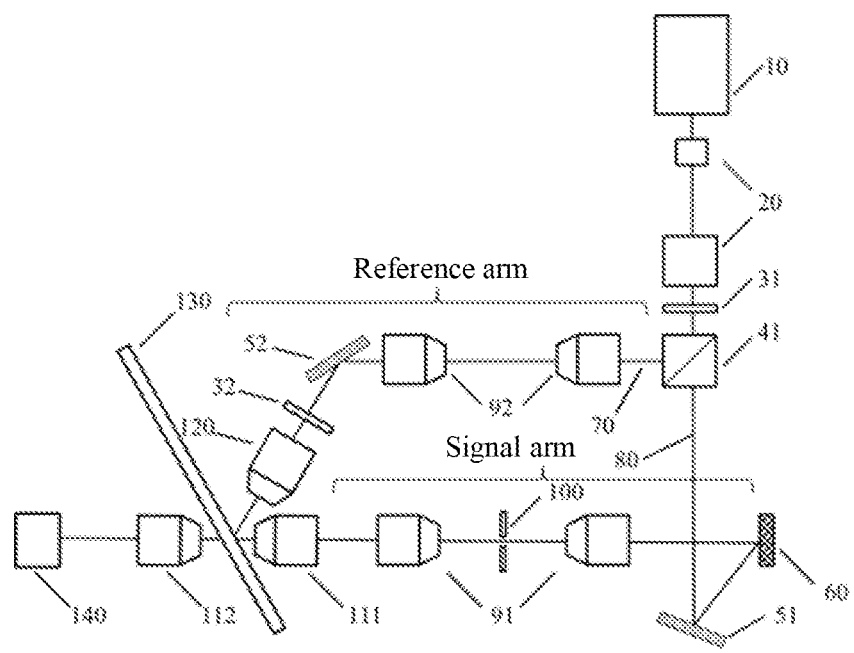
FIG. 1 shows a conventional holographic data storage device with a dual-arm structure.
Figure 2:
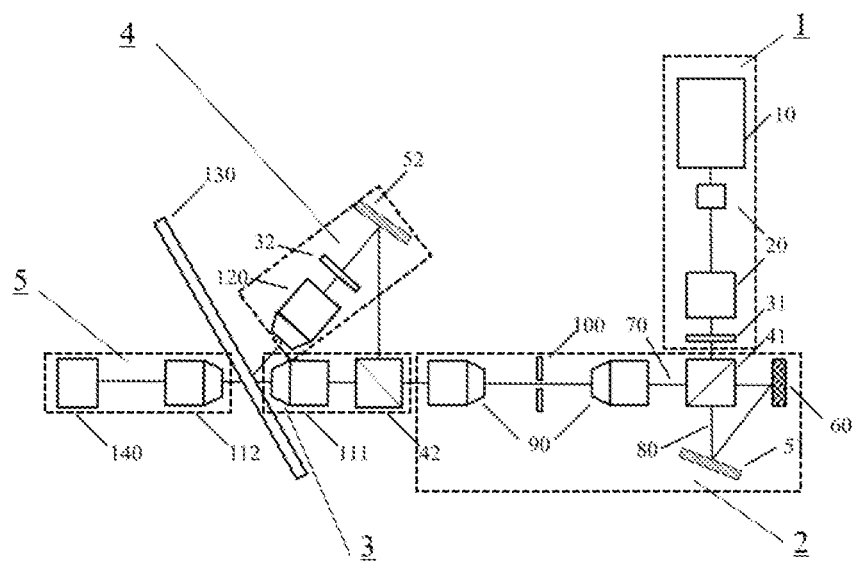
FIG. 2 shows DMD-based holographic data storage with a single-arm structure according to an embodiment of the present application.

FIG. 2 shows a Digital Micro-mirror Device (DMD)-based holographic storage system with a single-arm structure provided by this embodiment. The main components are as follows: light source transmitter 10; beam expander 20; first half-wave plate 31; second half-wave plate 32; first polarizing beam splitter 41; second polarizing beam splitter 42; first reflector 51; second reflector 52; spatial light modulator 60; reference beam 70; signal beam 80; relay lens group 90; low-pass filter 100; first Fourier lens 111; second Fourier lens 112; condensing lens 120; storage medium 130; photodetector 140.

A holographic data storage device with a single-arm structure adopted in this embodiment includes a laser output unit 1, a beam combining unit 2, a reference arm 4, a beam splitting unit 3, and a signal reproduction unit 5. The laser output unit 1 is configured to output light and perform beam expansion processing on the light. The light subjected to beam expansion processing is incident to the beam combining unit 2, and the beam combining unit 2 converts the input light into a signal beam and a reference beam which are coaxial and have orthogonal polarization directions, and outputs same to the beam splitting unit 3. The beam splitting unit 3 separates the received signal beam and reference beam, the reference beam enters the reference arm 4, and the signal beam is incident to a storage medium. The reference beam is adjusted by the reference arm 4 and then incident to the storage medium. The signal beam and the reference beam are emitted and interfered on the storage medium to form a hologram for recording information in the storage medium, and storage capacity can be increased by a reference light shift multiplexing method. The signal reproduction unit 5 is configured to read a signal stored in the storage medium.

The laser output unit includes a laser device 10, a beam expander 20, and a first half-wave plate 31. The beam combining unit includes a beam combiner, a spatial light modulator 60, a first reflector 51, and a relay lens group 90. The beam combiner in this embodiment is a first polarizing beam splitter 41. The beam splitting unit includes a beam splitter and a first Fourier lens 111. The beam splitter in this embodiment is a second polarizing beam splitter 42. The reference arm includes a second reflector 52 and a second half-wave plate 32. The signal reproduction unit includes a second Fourier lens 112 and a photodetector 140.

In this embodiment, light emitted from the laser device 10 passes through the beam expander 20 and the first half-wave plate 31, and is then divided by the first polarizing beam splitter 41 into a vertically polarized reflected reference beam 70 and a horizontally polarized transmitted signal beam 80. The transmitted signal beam 80 is reflected by the first reflector 51 and then loaded with an input modulation signal by the spatial light modulator 60. The modulated signal beam is incident to the first polarizing beam splitter 41 again, and converges with the reflected reference beam 70, and then together passes through the relay lens group 90 and the low-pass filter 100. Signal light and reference light are then separated by the second polarizing beam splitter 42 and enter a signal light channel and a reference light channel, respectively. The signal light is converged on the storage medium 130 by the Fourier lens 111, the polarization direction is adjusted to the horizontal direction after the reference light passes through the half-wave plate 32, and the spherical wave formed by the condensing lens 120 is incident to the same position on the storage medium 130 and interferes with the signal light, and the resulting hologram is recorded in the storage medium.

When reading the signal, the spatial light modulator 60 has no input signal. In this case, only the reference light beam is irradiated on the hologram for recording information in the storage medium, and input information is reproduced by the obtained diffracted light in the original signal beam direction, and is read by the photodetector 140.

In this embodiment, the beam intensity ratio of the signal beam to the reference beam is adjusted by the first half-wave plate 31.

In this embodiment, the spatial light modulator 60 is a DMD, which has no requirement on the polarization state of the incident light.

In this embodiment, a lens in the relay lens group 90 is fixed on an actuator that can move in the optical axis direction or the shift multiplexing direction. If the conditions of reading and recording are different due to changes in medium temperature, etc., the actuator is controlled to compensate for an error. The actuator only operates in a readout process.

Embodiment 2

Figure 3:
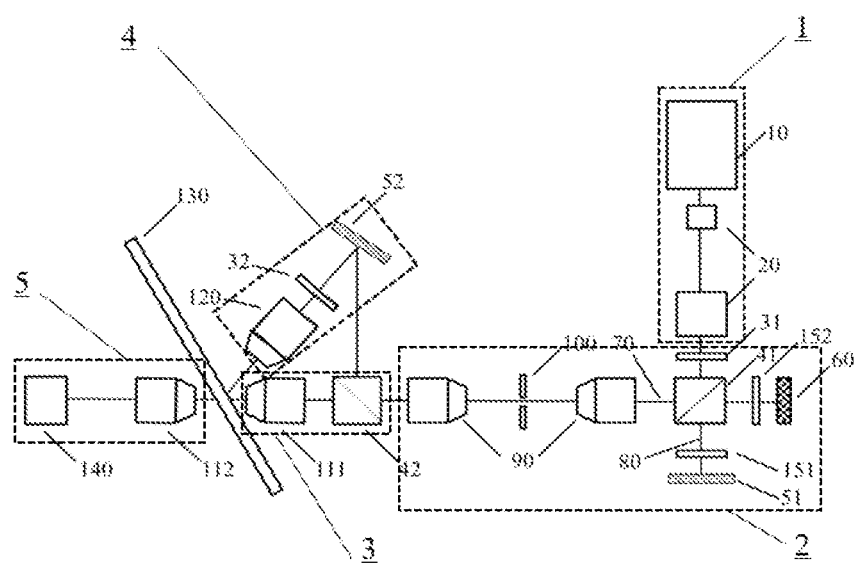
FIG. 3 shows LCD-based holographic data storage with a single-arm structure according to an embodiment of the present application.

FIG. 3 shows a Liquid Crystal Device (LCD)-based holographic storage system with a single-arm structure provided by this embodiment. The main components are as follows: laser device 10; beam expander 20; first half-wave plate 31; second half-wave plate 32; first polarizing beam splitter 41; second polarizing beam splitter 42; first reflector 51; second reflector 52; spatial light modulator 60; reference beam 70; signal beam 80; relay lens group 90; low-pass filter 100; first Fourier lens 111; second Fourier lens 112; condensing lens 120; optical disk 130; photodetector 140; first quarter-wave plate 151; second quarter-wave plate 152.

A holographic data storage device with a single-arm structure adopted in this embodiment is basically the same as that in Embodiment 1 in structure, and the difference lies in the beam combining unit 2. The beam combining unit 2 in this embodiment further includes the first quarter-wave plate 151 and the second quarter-wave plate 152.

In this embodiment, light emitted from the laser device 10 passes through the beam expander 20 and the first half-wave plate 31, and is then divided by the first polarizing beam splitter 41 into a vertically polarized reflected reference beam 70 and a horizontally polarized transmitted signal beam 80. After the transmitted signal beam 80 is reflected by the first reflector 51 and transmitted twice by the first quarter-wave plate 151, the polarization direction becomes the vertical direction, and the signal beam 80 is reflected by the first polarizing beam splitter 41, and then loaded with an input signal by the spatial light modulator 60 and reflected after passing through the second quarter-wave plate 152. The modulated signal beam passes through the second quarter-wave plate 152 again, and then is incident to the first polarizing beam splitter 41 again, and combines with the reflected reference beam 70, and then is imaged by the relay lens group 90 and filtered by the low-pass filter 100 together.

Signal light and reference light are then separated by the second polarizing beam splitter 42 and enter a signal light channel and a reference light channel, respectively. The signal light is converged on the optical disk 130 by the Fourier lens 111, the polarization direction is adjusted to the horizontal direction after the reference light passes through the half-wave plate 32, and the spherical wave formed by the condensing lens is incident to the same position on the optical disk 130 and interferes with the signal light, and the resulting hologram is recorded in the storage medium.

When reading the signal, the spatial light modulator 60 has no input signal. In this case, only the reference light beam is irradiated on the hologram for recording information in the optical disk, and input information is reproduced by the obtained diffracted light in the original signal beam direction, and is read by the photodetector 140.

In this embodiment, the beam intensity ratio of the signal beam to the reference beam is adjusted by the first half-wave plate 31.

In this embodiment, the spatial light modulator 60 is an LCD, which is an amplitude-type liquid crystal spatial light modulator.

In this embodiment, a lens in the relay lens group 90 is fixed on an actuator that can move in the optical axis direction or the shift multiplexing direction. If the conditions of reading and recording are different due to changes in medium temperature, etc., the actuator is controlled to compensate for an error. The actuator only operates in a readout process.

According to the above-mentioned embodiments, a part of the reference arm and a part of the signal arm are integrated together to form a single-arm structure, which can not only reduce the number of optical and mechanical elements, but also reduce the system volume and cost without degrading performance. In addition, the signal beam and the reference beam share the same relay lens, so that the impact of environmental interference on the two beams is equal, and the stability of the system is improved.

Apparently, the above-mentioned embodiments of the present invention are merely examples to clearly illustrate the technical solutions of the present invention, and are not intended to limit the specific embodiments of the present invention. Any modifications, equivalent substitutions, and improvements, etc. made within the spirit and scope of the claims of the present invention shall fall within the protection scope of the claims of the present invention.

What is claimed is:

1. A holographic data storage device with a single-arm structure, wherein a spherical light wave is used as a reference beam to interfere with a signal beam on a storage medium to form a hologram, and storage capacity is increased by a shift multiplexing method; the holographic data storage device comprises a beam combiner and a beam splitter, which perform beam combining and splitting operations on the reference beam and the signal beam successively; and a relay lens group comprising a filter is disposed between the beam combiner and the beam splitter to transmit and filter patterns on a spatial light modulator.

2. The holographic data storage device with a single-arm structure according to claim 1, wherein the beam combiner and the beam splitter are optical elements with polarization selectivity characteristics.

3. The holographic data storage device with a single-arm structure according to claim 1, wherein the filter is a low-pass filter, configured to control the size of the hologram on the storage medium.

4. The holographic data storage device with a single-arm structure according to claim 1, wherein at least one of lens elements in the relay lens group is installed on a translation stage in a beam axis direction.

5. The holographic data storage device with a single-arm structure according to claim 1, wherein at least one of lens elements in the relay lens group is installed on a translation stage in a shift multiplexing direction.

6. A holographic data storage device with a single-arm structure, comprising: a laser output unit, a beam combining unit, a reference arm, and a beam splitting unit, wherein the laser output unit is configured to output light and perform beam expansion processing on the light; the light subjected to beam expansion processing is incident to the beam combining unit, and the beam combining unit converts the input light into a signal beam and a reference beam which are combined into a common beam and have orthogonal polarization directions, and outputs same to the beam splitting unit; the beam splitting unit separates the received signal beam and reference beam, the reference beam enters the reference arm, and the signal beam is incident to a storage medium; the reference beam is adjusted by the reference arm and then incident to the storage medium; the signal beam and the reference beam are emitted and interfered on the storage medium to form a hologram for recording information in the storage medium, and storage capacity can be increased by a shift multiplexing method.

7. The holographic data storage device with a single-arm structure according to claim 6, further comprising a signal reproduction unit, configured to read a signal stored in the storage medium.

8. The holographic data storage device with a single-arm structure according to claim 6, wherein the laser output unit comprises a light source emitter, a beam expander, and a half-wave plate; and light emitted from the light source emitter is processed by the beam expander and the half-wave plate and then incident to the beam combining unit.

9. The holographic data storage device with a single-arm structure according to claim 6, wherein the beam combining unit comprises a beam combiner, a spatial light modulator, a reflector, and a relay lens group; the beam combiner first divides light from the laser output unit into a reference beam and a signal beam with orthogonal polarization directions; the signal beam is reflected by the reflector and then loaded with an input modulation signal by the spatial light modulator; the modulated signal beam and reference beam converge in the beam combiner, pass through the relay lens group together, and then are incident to the beam splitting unit.

10. The holographic data storage device with a single-arm structure according to claim 9, wherein a low-pass filter is disposed in the middle of the relay lens group to spatially filter the signal beam.

11. The holographic data storage device with a single-arm structure according to claim 9, wherein the beam combiner is an optical element with polarization selectivity characteristics, which is a polarizing beam splitter.

12. The holographic data storage device with a single-arm structure according to claim 6, wherein the beam combining unit comprises a beam combiner, a spatial light modulator, a reflector, a first quarter-wave plate, a second quarter-wave plate, and a relay lens group; the beam combiner first divides light from the laser output unit into a reference beam and a signal beam with orthogonal polarization directions; after the signal beam is reflected by the reflector and transmitted twice by the first quarter-wave plate, the polarization direction becomes vertical polarization, and the signal beam is reflected by the beam combiner, passes through the second quarter-wave plate and then is loaded with an input signal by the spatial light modulator and reflected; the modulated signal beam is incident to the beam combiner again after passing through the second quarter-wave plate again, and combines with the reflected reference beam to pass through the relay lens group together and then is incident to the beam splitting unit.

13. The holographic data storage device with a single-arm structure according to claim 12, wherein a low-pass filter is disposed in the middle of the relay lens group to spatially filter the signal beam.

14. The holographic data storage device with a single-arm structure according to claim 12, wherein the beam combiner is an optical element with polarization selectivity characteristics, which is a first polarizing beam splitter.

15. The holographic data storage device with a single-arm structure according to claim 6, wherein the beam splitting unit comprises a beam splitter and a Fourier lens; the signal beam and the reference beam from the beam combining unit are separated by the beam splitter; the signal beam is incident to the Fourier lens and then to the storage medium; and the reference beam is incident on the reference arm.

16. The holographic data storage device with a single-arm structure according to claim 15, wherein the beam splitter is an optical element with polarization selectivity characteristics, which is a polarizing beam splitter.

17. The holographic data storage device with a single-arm structure according to claim 6, wherein the reference arm comprises another reflector and another half-wave plate; the polarization direction is adjusted by the another half-wave plate after the incident reference beam passes through the another reflector, so that the reference beam is the same as the signal beam and then incident to the storage medium.

18. The holographic data storage device with a single-arm structure according to claim 7, wherein the signal reproduction unit comprises another Fourier lens and a photodetector; the reference beam is irradiated on a hologram for recording information in the storage medium, and input information is reproduced by the obtained diffracted light in the original signal beam direction, and is read by the photodetector after being processed by the another Fourier lens.

19. A holographic data storage device with a single-arm structure, comprising a first polarizing beam splitter and a second polarizing beam splitter, which are configured to combine and split light beams, respectively; the first polarizing beam splitter divides an incident beam into a reference beam and a signal beam with orthogonal polarization directions, the signal beam is loaded data signal by a spatial light modulator and is then combined with the reference beam through the first polarizing beam splitter; the combined signal beam and the reference beam are transmitted and filtered by a relay lens group including a filter, and then divided into the signal beam and the reference beam by the second polarizing beam splitter, which are emitted and interfered on a storage medium to form a hologram for recording information in the storage medium.

20. The holographic data storage device with a single-arm structure according to claim 19, wherein the filter is a low-pass filter, configured to control the size of the hologram on the storage medium.

* * * * *